(No Model.) 3 Sheets—Sheet 1.
G. MATHESON.
MACHINE FOR EXPANDING THE ENDS OF PIPES.
No. 409,994. Patented Aug. 27, 1889.
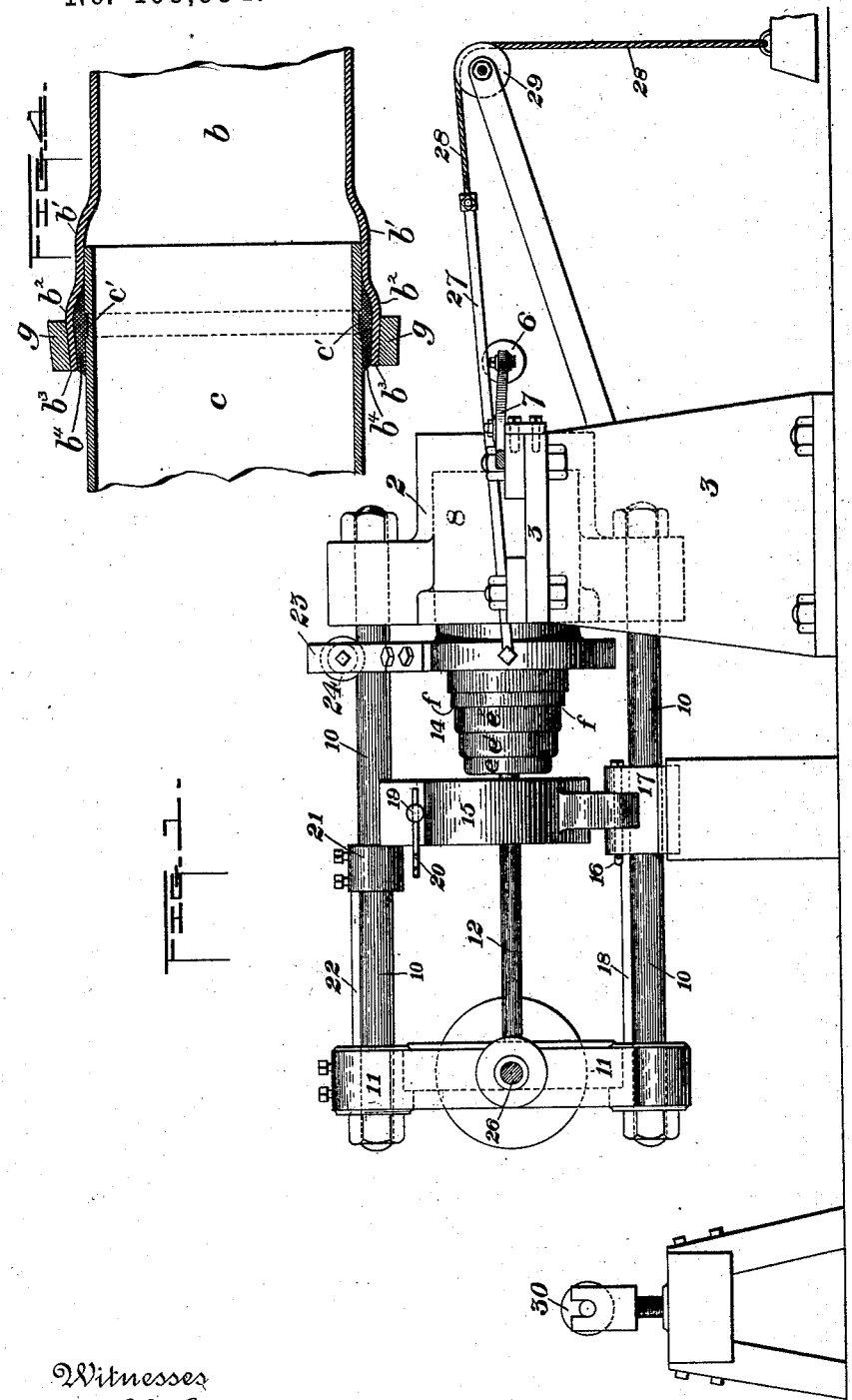
Witnesses
H. L. Gill
N. P. Corwin
Inventor
George Matheson
by W. Bakewell & Sons
his Attorneys (No Model.) 3 Sheets—Sheet 2.
G. MATHESON.
MACHINE FOR EXPANDING THE ENDS OF PIPES.
No. 409,994. Patented Aug. 27, 1889.
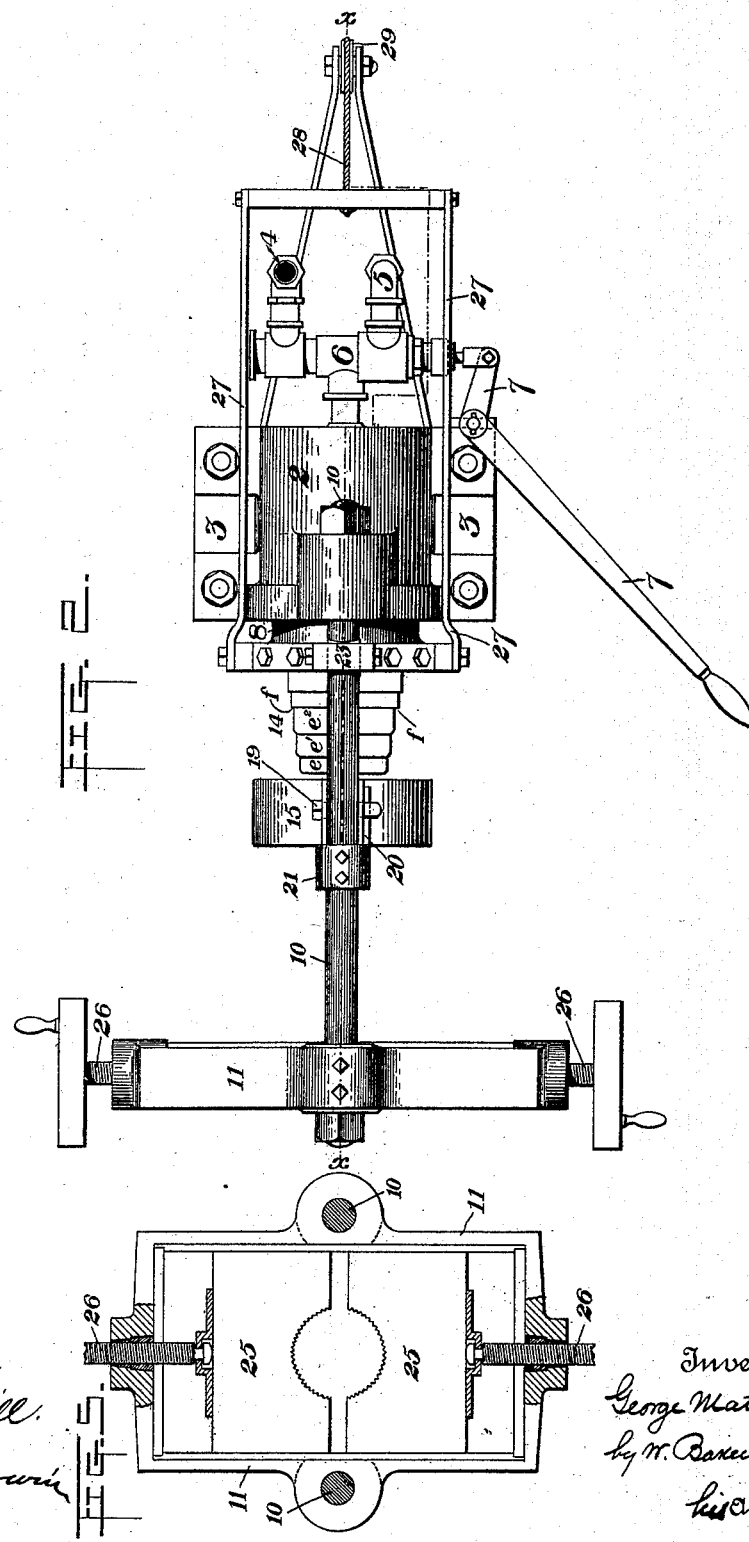

(No Model.) 3 Sheets—Sheet 3.
G. MATHESON.
MACHINE FOR EXPANDING THE ENDS OF PIPES.
No. 409,994. Patented Aug. 27, 1889.
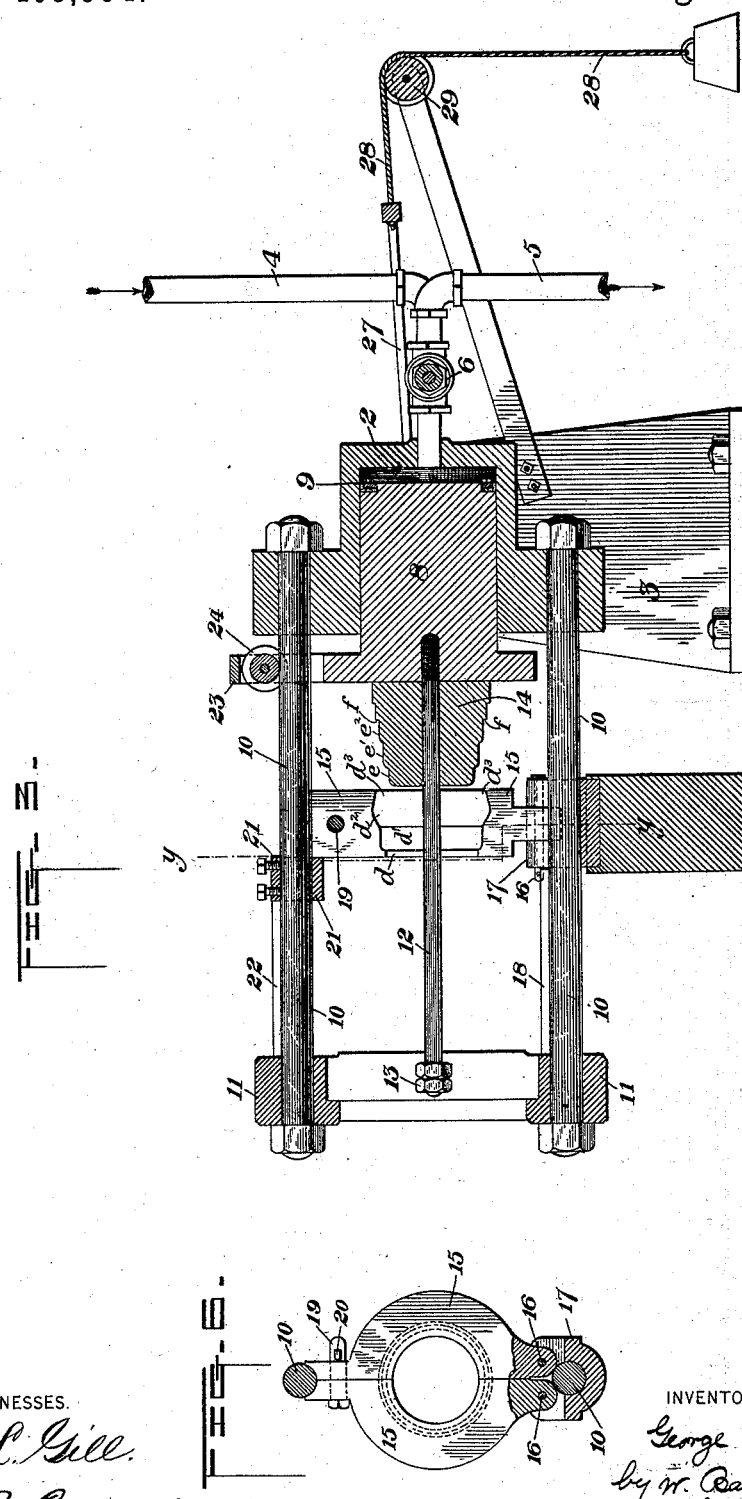
WITNESSES.
H. L. Gill.
N. B. Corwin
INVENTOR.
George Matheson
by W. Bakewell & Son
his Attorneys

UNITED STATES PATENT OFFICE.

GEORGE MATHESON, OF BROOKLYN, NEW YORK.

MACHINE FOR EXPANDING THE ENDS OF PIPES.

SPECIFICATION forming part of Letters Patent No. 409,994, dated August 27, 1889.

Application filed December 3, 1888. Serial No. 292,466. (No model.)

*To all whom it may concern:*

Be it known that I, GEORGE MATHESON, of Brooklyn, in the county of Kings and State of New York, have invented a new and useful Improvement in Machines for Expanding the Ends of Pipes; and I do hereby declare the following to be a full, clear, and exact description thereof, reference being had to the accompanying drawings, forming part of this specification, in which—

Figure 1 is a side elevation of my improved machine. Fig. 2 is a plan view thereof. Fig. 3 is a vertical longitudinal section on the plane $x\ x$ of Fig. 2. Fig. 4 is an axial longitudinal section of a pipe-joint, showing a pipe the end of which has been flared and shaped by the machine. Fig. 5 is an end view, partly in section, of Fig. 1, showing the gripping mechanism by which the pipe is held during the flaring and shaping of its end. Fig. 6 is a vertical cross-section on the line $y\ y$ of Fig. 3, showing in front elevation the annular die, within which the end of the pipe is expanded by the mandrel of the machine.

Like symbols of reference indicate like parts in each.

I have devised the present machine especially for the purpose of flaring and shaping the ends of pipes, in order to fit them for use in forming pipe-joints, such as shown in Fig. 4 of the drawings.

Referring to this figure, $b$ and $c$ represent pipes which are joined together at their abutting ends, the spigot end of the pipe $c$ fitting within the flared or bell-shaped end of the pipe $b$, so as to form an annular space within the bowl of the pipe $b$ and around the pipe $c$, in which calking material—such as molten lead—is poured for the purpose of sealing the joint.

I shall now describe the shape of the flared end of the pipe $b$. At the rear or inner portion of the flared end there is an annular portion $b'$ of the pipe, which is expanded somewhat relatively to the cylindrical part $b$ of the pipe, the inner end of the portion $b'$ forming an annular shoulder or stop, against which the end of the pipe $c$ abuts, as shown in the drawings. Next to the portion $b'$ of the pipe there is an annular portion $b^2$, which is expanded to greater diameter than the portion $b'$, and next to and outside of the portion $b^2$ the end $b^3$ of the pipe is expanded to a diameter greater than that of the portion $b'$, but somewhat less than that of the portion $b^2$. There is thus formed within the pipe, opposite to the flared portion $b^2$, an annular recess $b^4$, which is limited on one side by the annular portion $b'$ and on the other by the end portion $b^3$. An annular groove $c'$ is cut around the pipe $c$, opposite to the annular recess $b^4$ of the pipe $b$, and this recess $b^4$, in conjunction with the groove $c'$, affords means for holding the lead or other calking material in place when it has been poured around the joint inside of the bell end of the pipe $b$.

The pipe-joint which is thus produced possesses many advantages. It is strong as regards the construction of the pipe, because the joint is not weakened by tapping of screw-threads, nor is it weakened by producing the recess $b^4$ by cutting into the material of the pipe $b$, and the joint being thus of proper strength the body of the pipe can be made of comparatively lighter material and with correspondingly less cost than if the joint were weakened by tapping, as before indicated. While this joint is in these respects a good one, the fact that the recess $b^4$ is made by expanding an annular portion in the interior of the pipe would cause it to be quite difficult to manufacture with the imperfect appliances heretofore known in the art. I have therefore devised my present machine, which is so constructed as to expand and shape the end of a pipe with great rapidity, saving of labor, and with uniformity and regularity in the product of the machine.

Referring now to Figs. 1, 2, and 3, 2 represents a hydraulic cylinder which is mounted on a suitable pedestal or support 3, and which is provided with the usual water-supply pipe 4, discharge-pipe 5, valve 6, and valve-lever 7, by means of which water under pressure may be caused to enter the cylinder and to discharge therefrom in the usual way.

8 is the plunger or piston of the cylinder, which is preferably made of a single casting and has at its base an encircling packing-ring 9.

10 are horizontal braces or guide-rods, which are secured by nuts to projecting inner wings of the cylinder 2, and at their outer ends are secured to the box or frame 11.

12 is a rod, which is attached at one end to the plunger 8 and projects axially therefrom between the braces 10. On the outer end of the rod 12 is a stop or head consisting, preferably, of removable nuts 13. The mandrel 14, which acts to expand the pipe, consists of a block of metal of substantially cone shape, which is mounted on the rod 12 and is movable thereon from end to end of the rod.

When the machine is in the act of expanding the pipe, the rear end of the mandrel abuts against the outer face of the plunger 8. In advance of and opposite to the face of the plunger 8 is the annular die, within which the end of the pipe is set during the expanding operation. This die is made of two sections 15, hinged at the bases by pins 16 to a block 17, which is mounted on the lower brace 10, and is steadied in position thereon by means of a strut or distance-piece 18. The two sections 15 are movable pivotally on the pins 16, and when brought together, as shown in Figs. 1, 2, and 6, they form a central annular die-cavity directly opposite to and concentric with the axis of the mandrel 14. When thus brought together the sections 15 of the die are confined in position by a bolt 19 and a key 20, which passes through a suitable slot in the bolt, and the upper ends of the conjoined sections are braced and steadied by means of a collar 21 on the upper brace 10, and by a strut or distance-piece 22, interposed between the collar and the box 11 at the ends of the braces. The plunger 8 is provided at its forward end with an upwardly-projecting standard 23, having at its upper end a guide-wheel 24, which travels on the surface of the upper brace 10, and a frame 27 projects rearwardly from the head of the plunger, and is provided at its end with a counterweighted cord or chain 28, which passes over a sheave 29, and affords means by which the plunger may be retracted automatically from an advanced position after the water in the cylinder has been exhausted.

Within the box 11, at the end of the braces 10, is a clamp consisting of two sections 25, which are mounted in horizontal guideways in the box 11, and each of which has a nearly-semicircular face. Adjusting-screws 26, which pass through the sides of the box 11, bear upon the outer sides of the sections 25 of the clamp, and afford means by which these sections may be moved together so as to grip and hold an interposed pipe.

I shall now describe the shape of the mandrel 14 and the cavity of the annular die 15. At the outer end of the latter cavity is an annular portion $d$, which is about the same in diameter as the outside diameter of the pipe to be shaped. In advance of this is an annular portion $d'$, of somewhat greater diameter than the portion $d$. In advance of this is an annular portion $d^2$, of greater diameter than the portion $d'$, and at the inner end of the cavity, next to the portion $d^2$, is an annular portion $d^3$, of greater diameter than the portion $d'$, and of somewhat less diameter than the portion $d^2$. As before stated, the mandrel 14 is in the form of a stepped cone having a series of annular portions or zones of increasing diameter from the forward end rearwardly. The outer zone $e$ is the same diameter as the portion $d$ of the die, less the thickness of the pipe to be shaped, the zone $e'$ bears the same relation to the annular portion $d'$ of the die, and the zone $e^2$ bears the same relation to the portion $d^3$ of the die.

The operation of the machine is as follows: In order to flare and shape the end of the pipe, as described by me in the first part of this specification, the end of the pipe is placed in a suitable furnace and brought to a welding heat, and the pipe is then placed on a supporting-roller 30 in front of the machine, and is moved longitudinally thereon between the grippers 25 (which are separated for this purpose) and over the rod 12 between the sections of the die 15. The grippers are then forced together by means of the adjusting-screws 26, so as to tightly clamp the pipe between them, the sections 15 of the die having been previously brought together and secured by the bolt 19 and key 20, and water under pressure is admitted into the hydraulic cylinder 2. The plunger 8 is thus forced forward, carrying with it the mandrel 14, which enters the end of the pipe. The zone $e$ at the end of the mandrel, being of the same external diameter as the interior of the pipe, enters the pipe without expanding it. The zone $e'$, being somewhat larger, expands the pipe as it enters, as does also the zone $e^2$, which is of still greater diameter. When the zone $e^2$ has entered the end of the pipe, the zone $e$ at the end of the mandrel will be within the annular portion $d$ of the die-cavity, and as the mandrel continues to advance the circular stop or shoulder $f$ at the rear of the zone $e^2$ engages the end of the pipe and tends to force it inward. All the portions of the pipe will then have been expanded into contact with the circumference of the die, which limits its further expansion, except at the groove-like annular portion $d^2$ of the die, and the effect of the inward pushing exerted on the pipe by the shoulder $f$, therefore, swells out the hot material of the pipe into the annular portion $d^2$, which is the one cavity remaining for its expansion, thus producing an annular outward flare or bulge of the pipe at this place, which flare is of greater diameter than that of the portion $e^2$ of the mandrel which is opposite thereto. The form of the flare thus produced is clearly shown in Fig. 4, the unflared portion $b$ of the pipe being at the end of the operation in the annular portion $d$ of the die, the portion $b'$ of the pipe being in the portion $d'$ of the die, the flared or bulged portion $b^2$ of the pipe being in the portion $d^2$ of the die, and the end portion $b^3$ of the pipe being in the portion $d^3$ of the die. When the pipe end has been thus expanded, the key 20 and bolt 19 are removed, the sections 15 of the die are opened to release the pipe therefrom, since without opening them the pipe could not be disengaged from the annular recess $d^2$ of the die-cavity, the clamps 25, which have during the operation held the pipe against the pressure of the mandrel, are opened, and in order to strip the pipe from the mandrel the pipe is pulled lengthwise from the machine until the end of the mandrel engages the stop 13 at the end of the rod 12, when ordinarily the pipe can easily be drawn off. If, however, it should stick on the mandrel, it may be removed by pushing the pipe back again toward the plunger and drawing it forward repeatedly until the mandrel engages the stop and the successive impetus of the blows thus put on the mandrel will readily disengage it from the interior of the pipe.

I have found in practice that it makes the mandrel somewhat easier to disengage and prevents its corrosion or burning to coat it with lubricating-oil before the beginning of the operation of expanding the pipe end.

The action of the machine in expanding the pipe is very rapid and the labor of handling the pipe is small, so that I am enabled to form the joints above described with very little cost.

In order to strengthen the joint after the pipe has been expanded, I prefer to shrink on the end of the pipe a ring $g$, as shown in Fig. 4.

Of course the die, mandrel, and clamp must be exchanged for corresponding parts of different size when the size of the pipe to be operated on in the machine is changed; but from the construction and relative arrangement of these parts it is clear that their removal and readjustment is easy.

The machine may be varied in its construction by the skilled mechanic without departing from the principles of my invention—e. g., I do not limit myself to the use of hydraulic mechanism for producing the motive power for the machine, since suitable screw or steam appliances or other devices may be used for the same purpose, and other modifications may be made.

I do not herein claim the method of expanding the ends of pipes by outward expansion in combination with end pressure, since I have made it the subject of a separate patent application, Serial No. 292,465, filed December 3, 1888; but

What I claim as my invention is—

1. In a machine for shaping the ends of pipe by end compression of a mandrel, a die for confining the pipe during the shaping operation, said die having an internal groove-like recess within which the metal may flow to form a swell in the pipe, substantially as and for the purposes described.

2. In a machine for expanding and shaping the ends of pipes by end compression of a stepped or tapering mandrel, a die for confining the pipe, said die being flared to permit expansion of the pipe, and having an internal groove-like recess within which the metal may flow to form a swell in the pipe, substantially as and for the purposes described.

3. In a machine for expanding the ends of pipes, the combination of a movable expanding cone or mandrel and a rod affixed to the moving head or plunger by which the mandrel is actuated, said mandrel being movably mounted on said rod, and a stop on the rod which affords resistance to the mandrel during the act of stripping the pipe therefrom, substantially as and for the purposes described.

4. In a machine for expanding the ends of pipes, the combination of a movable expanding cone or mandrel, a die which incloses the pipe around the portion thereof which is to be expanded, and a separate clamp or gripper by which the pipe is held while being expanded, substantially as and for the purposes described.

5. In a machine for expanding the ends of pipes, the combination of a plunger 8, a projecting rod 12, the cone or mandrel 14, which is loosely mounted on the rod, a sectional die 15, having a suitable forming-cavity, and a clamp or gripper 25, by which the pipe is held, substantially as and for the purposes described.

In testimony whereof I have hereunto set my hand this 16th day of November, A. D. 1888.

GEORGE MATHESON.

Witnesses:
R. W. CARROLL,
R. G. CAMPBELL.